No. 629,981. Patented Aug. 1, 1899.
J. A. V. BRANN.
PAN, POT, OR LID LIFTER.
(Application filed Apr. 24, 1899.)
(No Model.)
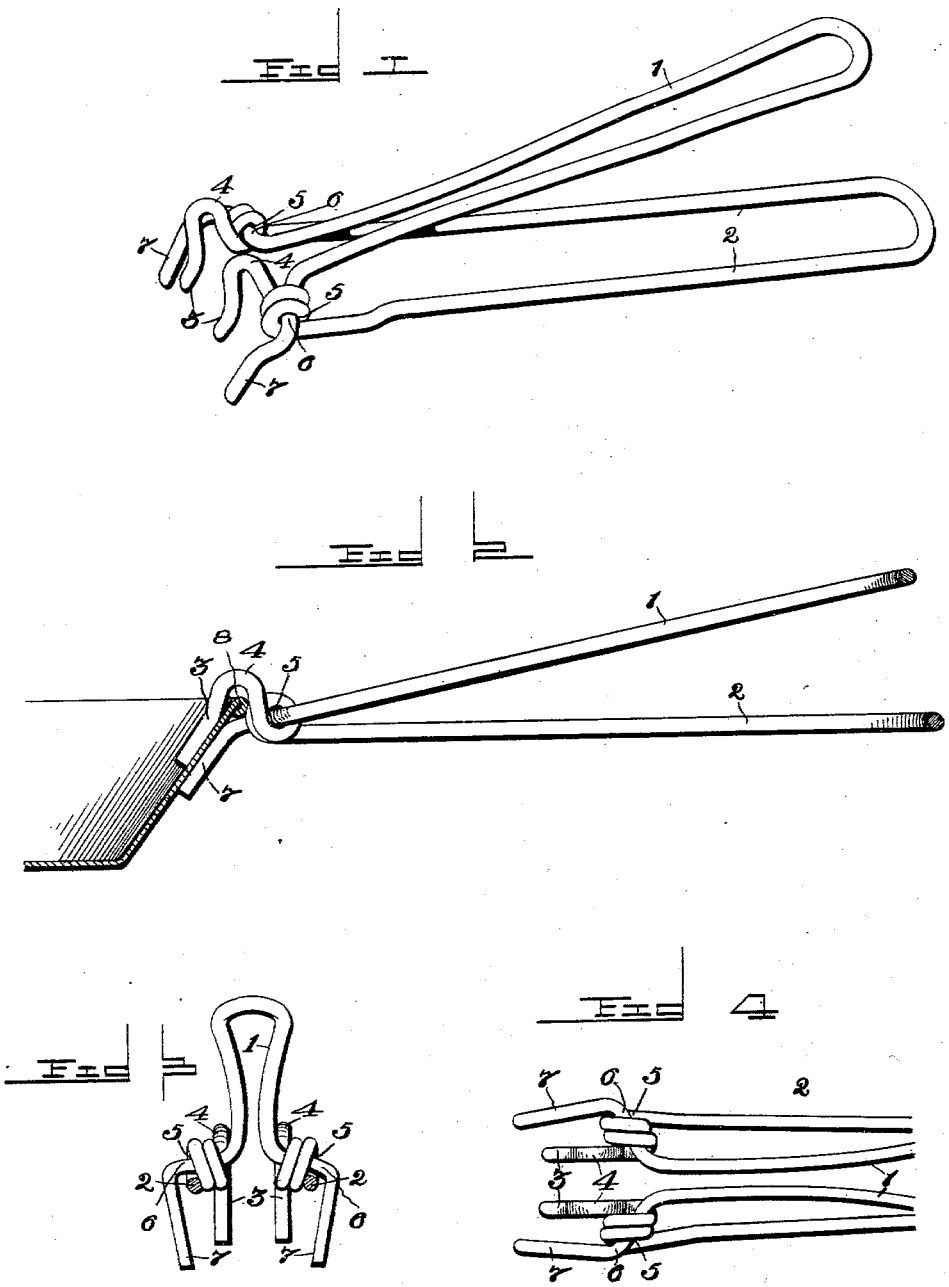
Witnesses
John Maupin
J. A. V. Brann Inventor
By his Attorneys,
C A Snow & Co.

UNITED STATES PATENT OFFICE.

JOHN A. V. BRANN, OF WATER VALLEY, KENTUCKY.

PAN, POT, OR LID LIFTER.

SPECIFICATION forming part of Letters Patent No. 629,981, dated August 1, 1899.

Application filed April 24, 1899. Serial No. 714,216. (No model.)

*To all whom it may concern:*

Be it known that I, JOHN A. V. BRANN, a citizen of the United States, residing at Water Valley, in the county of Graves and State of Kentucky, have invented a new and useful Pan, Pot, or Lid Lifter, of which the following is a specification.

This invention relates to pan, pot, and lid lifters of that class embodying jaws controlled by separate handles, and has for its object to provide a simple and improved device of this character which is adapted to spring open when the handles are released.

To this end the present invention consists in the combination and arrangement of parts, as will be hereinafter more fully described, shown in the accompanying drawings, and particularly pointed out in the appended claims.

In the drawings, Figure 1 is a perspective view of the lifter. Fig. 2 is a longitudinal sectional view thereof applied to a pan. Fig. 3 is a rear view of the device, the upper handle being elevated and the lower handle in section. Fig. 4 is a top plan view of the implement.

Corresponding parts are designated by like reference characters in all the figures of the drawings.

Referring to the accompanying drawings, 1 and 2 designate, respectively, the upper and lower handle members of the implement, each member being formed from a single length of heavy wire bent intermediate of its ends into substantially U shape. The free ends of the opposite sides of the lower member are bent into hooked jaws 3, having the bends 4 thereof disposed above the plane of the handle member and the bills of the hooks extending downward below the same. At the vertex of the angle between each hooked jaw and the adjacent side of the lower handle member the wire is twisted into an eye 5 and these eyes are disposed transversely. By reference to Fig. 3 it will be noted that each of the eyes 5 is formed by two coils or twists of the wire, which are disposed between the sides of the lower handle member, whereby the hooked jaws are located comparatively close together.

The sides of the upper handle member are bent outwardly near their free ends to form oppositely-extending bearing-arms 6, and the extremities of the sides beyond the bearing-arms are deflected downward to form the straight prongs or jaws 7.

In the manufacture of the implement the upper handle member is formed first, and then the sides of the lower handle member are twisted about the bearing-arms 6 of the upper handle member, and thus the members are pivoted or hinged together with the hooked jaws located above and alined between the straight jaws 7.

As shown in Fig. 2, the implement is adapted to be applied to a pan by engaging the hooked jaw over the rim or flange 8 of the pan, the bends 4 of the respective jaw members being adapted to receive and fit against the bead or upper edge of the rim and the straight jaw members 7 engaging flat against the outside of the pan. It will be understood that as the hooked jaws engage the inner side of the flange of the pan and the straight jaws the outer side thereof and at opposite sides of the hooked jaws the pan will be tightly gripped by the jaws of the implement and prevented from tilting thereon.

By reversing the implement the hooked jaws may be engaged in the lifter-opening of a stove-lid, whereby the implement is adapted for use as a stove-lid lifter. Furthermore, the bail-handle of a pot may be received in the bends of the hooked jaws for the purpose of lifting a pot.

It will be noted by reference to Fig. 3 that the coils or eyes 5 are inclined inwardly and upwardly between the sides of the lower handle member, so that when the handle members are pressed together the sides of the upper member will be forced together by engagement with the inner sides of the coils 5, and thereby also draw the sides of the lower handle member together. When the handles are released, the sides thereof will spring outward into their normal positions, and thus both members will be forced apart upon the hinged connection thereof or opened. By reference to Fig. 4 it will be seen that the bearing-arms 6 are inclined forwardly, so as to bind in the eyes or coils 5, whereby the arms are prevented from being moved longitudinally through the eyes during the closing movement of the handle members and the sides of the latter are compelled to draw together.

Changes in the form, proportion, and the minor details of construction may be resorted to without departing from the spirit or sacrificing any of the advantages of this invention.

Having thus described my invention, what I claim is—

1. A device of the class described, comprising opposite handle members provided with gripping-jaws, and pivoted or hinged together, each member being formed from a single length of wire bent intermediate of its ends into substantially U shape, one of the members having its free ends bent into hook-shaped jaws, the bends thereof being at one side of the plane of the handle member and the bills of the hooks extending across the end of the member, and transversely-disposed eyes formed by twisting the sides of the member into coils located at the vertexes of the angles formed between the hooked jaws and the adjacent sides of the member, the other handle member having its sides bent outwardly forming bearing-arms located near the free ends of the sides, and the extremities of the latter bent into straight gripping-jaws located entirely at one side of the handle member, and the bearing-arms of one member being pivotally received within the eyes or coils of the other member, substantially as shown and described.

2. A device of the class described, comprising opposite handle members provided with gripping-jaws and pivoted or hinged together, each member being formed from a single length of wire bent into substantially U shape, one of the members having its sides bent outwardly to provide opposite bearing-arms, and then deflected to form gripping-jaws, the other member having its free ends bent into jaws, and its sides twisted into transversely-disposed coils, located between the opposite sides, and inclined inwardly and upwardly, the bearing-arms of the former member being pivotally received within the respective coils, substantially as shown and described.

In testimony that I claim the foregoing as my own I have hereto affixed my signature in the presence of two witnesses.

JOHN A. V. BRANN.

Witnesses:
C. W. BINFORD,
RIAS DACUS.